(12) United States Patent
Tanabe et al.

(10) Patent No.: US 7,863,840 B2
(45) Date of Patent: Jan. 4, 2011

(54) MOTOR DRIVING CIRCUIT

(75) Inventors: Masashi Tanabe, Olzumi-machi (JP); Shunji Suzuki, Olzumi-machi (JP)

(73) Assignees: Sanyo Electric Co., Ltd, Osaka (JP); Sanyo Semiconductor Co., Ltd., Gunma (JP)

( * ) Notice: Subject to any disclaimer, the term of this patent is extended or adjusted under 35 U.S.C. 154(b) by 336 days.

(21) Appl. No.: 12/056,800

(22) Filed: Mar. 27, 2008

(65) Prior Publication Data

US 2008/0297959 A1 Dec. 4, 2008

(30) Foreign Application Priority Data

Apr. 5, 2007 (JP) .............................. 2007-099720

(51) Int. Cl.
*H02P 6/08* (2006.01)

(52) U.S. Cl. ...................... 318/293; 318/375; 318/379

(58) Field of Classification Search ................. 318/375, 318/376, 379, 280, 287, 291, 293, 294
See application file for complete search history.

(56) References Cited

U.S. PATENT DOCUMENTS 6,131,692 A * 10/2000 Kawasuji .................... 180/446

6,288,507 B1 * 9/2001 Makino et al. .............. 318/293
7,457,136 B2 * 11/2008 Ozaki .......................... 363/17

FOREIGN PATENT DOCUMENTS

JP 2002-272162 9/2002

\* cited by examiner

*Primary Examiner*—Bentsu Ro
(74) *Attorney, Agent, or Firm*—SoCal IP Law Group LLP; Steven C. Sereboff; John E. Gunther (57) ABSTRACT

A motor driving circuit comprising: a synchronous rectification driving circuit to carry out synchronous rectification, to energize a driving coil connected between a first connection point at which a first source and first sink side transistors are connected in series and a second connection point at which a second source and second sink side transistors are connected in series; a backflow detecting resistor connected to electrodes of the first and second sink side transistors, the electrodes being on an opposite side of the first and second sink side transistors to the first and second connection points; a backflow detecting comparator to output a comparison signal indicating a result of comparison of voltage between a first and second terminals of the backflow detecting resistor; and a backflow prevention circuit to prohibit the synchronous rectification when the comparison signal indicates that the second terminal is higher in voltage than the first terminal.

4 Claims, 9 Drawing Sheets

MOTOR DRIVING CIRCUIT

CROSS-REFERENCE TO RELATED APPLICATION

This application claims the benefit of priority to Japanese Patent Application No. 2007-99720, filed Apr. 5, 2007, of which full contents are incorporated herein by reference.

BACKGROUND OF THE INVENTION

1. Field of the Invention

The present invention relates to a motor driving circuit.

2. Description of the Related Art

In recent years, synchronous rectification that brings power efficiency higher than diode rectification has been receiving much attention in the field of motor driving circuit. Synchronous rectification means a rectification method that is carried out with focusing on low on-resistance of a field effect MOS transistor. According to the method, a field effect MOS transistor energizing a driving coil is utilized as a rectification element in synchronization with PWM drive (e.g., see Japanese Patent Application Laid-Open Publication No. 2002-272162). An operation of synchronous rectification will hereinafter be described.

Figure 9:
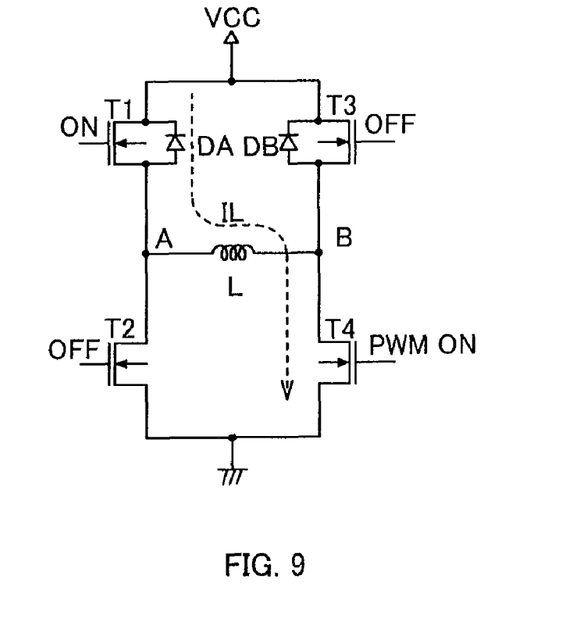
FIG. 9 is a diagram for explaining an operation of synchronous rectification.

An H-bridge circuit, as shown in FIG. 9, is configured such that one terminal of a driving coil L is connected to a connection point A at which a source side transistor T1 is connected to a sink side transistor T2, while the other terminal of the driving coil L is connected to a second connection point B at which a source side transistor T3 is connected to a sink side transistor T4.

When feeding a coil current IL through the driving coil L so as to flow from the connection point A toward the connection point B, the source side transistor T3 and the sink side transistor T2 is turned off. The source side transistor T1 is kept turned on constantly (saturation drive), and the sink side transistor T4 is turned on and off by a PWM signal having a duty ratio corresponding to motor rotation speed. When the PWM signal applied to a gate electrode of the sink side transistor T4 becomes H level to turn on the sink side transistor T4, the coil current IL flows through a power line, a drain-source path of the source side transistor T1, the connection point A, the driving coil L, the connection point B, the drain-source path of the sink side transistor T4, and a ground line in the order presented above, as shown in FIG. 9.

Then, when the PWM signal applied to the gate electrode of the sink side transistor T4 changes in level from H level to L level, that is, when the sink side transistor T4 changes in state from on to off, the driving coil L tries to maintain a direction of the coil current IL when the sink side transistor T4 is on (direction of the flow from the connection point A to the connection point B) because of inherent characteristics of the driving coil L.

In a field effect MOS transistor, a parasitic diode is present between the drain and the source of the field effect MOS transistor as a structural consequence. For example, between the drain and the source of the source side transistor T1, there is present a parasitic diode DA with an anode thereof being connected to the drain and a cathode thereof being connected to the source. Likewise, between the drain and the source of the source side transistor T3, there is present a parasitic diode DB with the anode thereof being connected to the drain and the cathode thereof being connected to the source.

Because of this, when the PWM signal applied to the gate electrode of the sink side transistor T4 changes in level from H-level to L-level, a regenerative current IL' flows through the power line, the drain-source path of the source side transistor T1, the connection point A, the driving coil L, the contact point B, and the parasitic diode DB of the source side transistor T3 in the above order. As a result, in the parasitic diode DB, there is consumed unnecessary power given by the product of a forward voltage VF and the regenerative current IL' (forward current).

Figure 10:
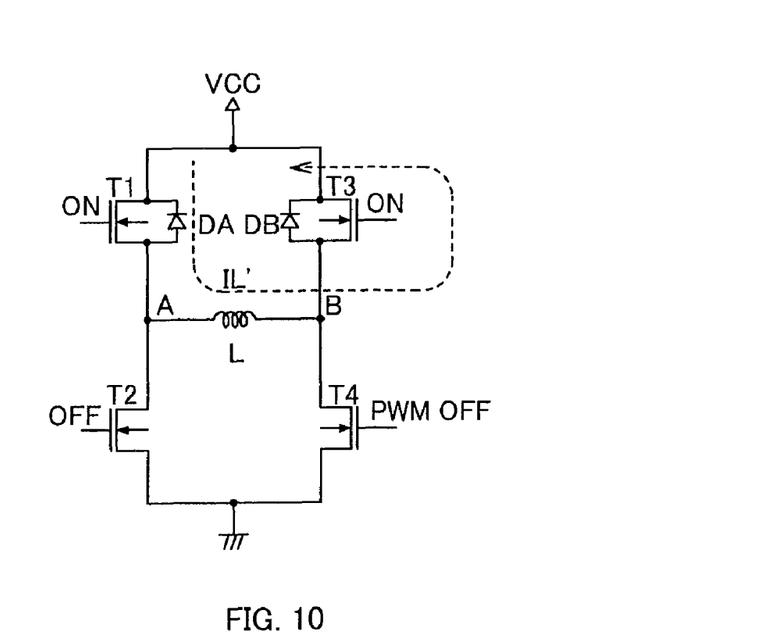
FIG. 10 is a diagram for explaining an operation of synchronous rectification.

To prevent this, the source side transistor T3 is forcibly turned on in synchronization with timing of change in state from on to off of the sink side transistor T4, as shown in FIG. 10. This causes large portion of the regenerative current IL' to flow through the source-drain path of the source side transistor T3 having on-resistance lower than that of the parasitic diode DB. Thus, power consumption in the parasitic diode DB is suppressed. Similarly, in the parasitic diode DA, the source side transistor T1 having on-resistance lower than that of the parasitic diode DA is forcibly turned on in synchronization with timing of change in state from on to off of the sink side transistor T2.

Figure 11:
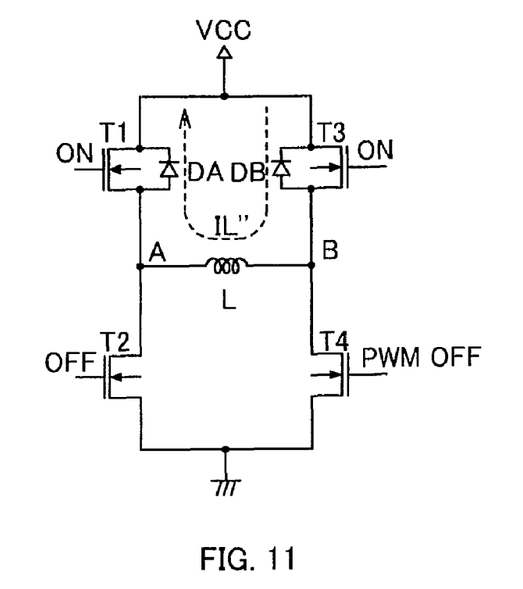
FIG. 11 is a diagram for explaining an operation of a backflow phenomenon when carrying out synchronous rectification.

When both of the source side transistors T1 and T3 are turned on to cause the regenerative current IL' to flow in the direction from the connection point A toward the connection point B, as shown in FIG. 10, a coil voltage is generated at the driving coil L. Therefore, in order to cancel the coil voltage generated at the driving coil L, a consumption current IL" flows, in a direction opposite to the regenerative current IL', through the power line, the drain-source path of the source side transistor T3, the connection point B, the driving coil L, the connection point A, and the source-drain path of the source side transistor T1 in the above order, as shown in FIG. 11.

Figure 12:
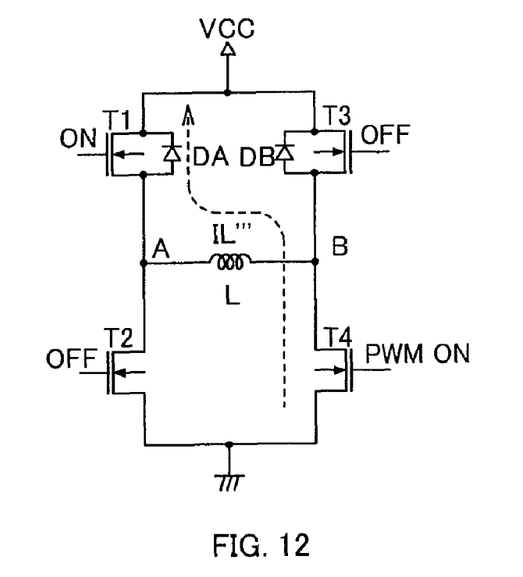
FIG. 12 is a diagram for explaining an operation of a backflow phenomenon when carrying out synchronous rectification.
Figure 13:
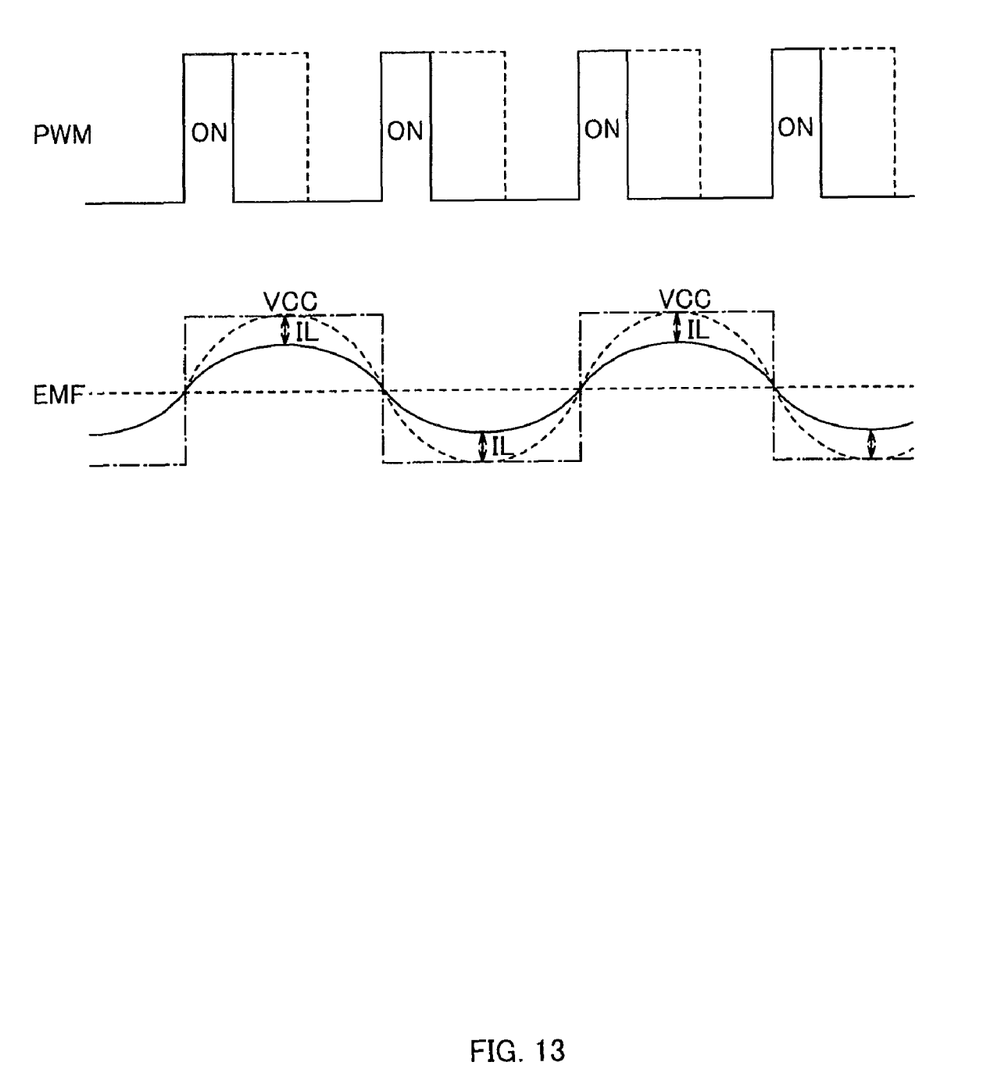
FIG. 13 is a waveform diagram for explaining a relation among a PWM signal, a coil voltage, and a coil current.

Then, the PWM signal applied to the gate electrode of the sink side transistor T4 changes again in level from L-level to H-level and the source side transistor T3, which is a subject of synchronous rectification, changes in level from on to off. When the consumption current IL" (see FIG. 11) attenuates as the source side transistor T3 changes in level from on to off, a backflow current IL''' (see FIG. 12) does not flow in a direction from the ground line toward the power line. If the consumption current IL" (see FIG. 11) attenuates incompletely and partly survives as the source side transistor T3 changes in level from on to off, the backflow current IL''' (see FIG. 12) in the same direction as that of the consumption current IL" flows through the ground line, the source-drain path of the sink side transistor T4, the connection point B, the driving coil L, the connection point A, the source-drain path of the source side transistor T1, and the power line in the above order. As a result of this, a level of a source voltage VCC becomes higher than a specification value, which may, at worst, result in a destruction of the motor driving circuit.

This backflow phenomenon in which the backflow current IL''' flows from the ground line toward the power line tends to occur when on-duty of the PWM signal is low. When the on-duty of the PWM signal is high, amplitude of a sine wave coil voltage EMF generated at the driving coil L is substantially identical with the amplitude of the source voltage VCC. Since the size of the coil current IL flowing through the driving coil L is in proportion to a level difference between the source voltage VCC and the coil voltage EMF, the coil current IL becomes small in amount in this case. When the on-duty of the PWM signal is low, the amplitude of the coil voltage EMF becomes small to increase a level difference between the source voltage VCC and the coil voltage EMF, so that the coil current IL is increased in amount.

When the on-duty of the PWM signal is high, the coil current IL is small in amount, so that the consumption current IL" (see FIG. 11) attenuates. It therefore becomes hard for the backflow current IL''' (see FIG. 12) to flow. On the other hand, when the on-duty of the PWM signal is low, the coil current IL is great in amount, so that the consumption current IL'' (see FIG. 11) survives. Therefore the flow of the backflow current IL''' (see FIG. 12) is facilitated. That is, when lowering the on-duty of the PWM signal, the backflow current IL''' (see FIG. 12) that may destroy the motor driving circuit flows easily.

SUMMARY OF THE INVENTION

A motor driving circuit according to an aspect of the present invention, comprises: a synchronous rectification driving circuit configured to turn on and off a first source side transistor and a second sink side transistor as well as a second source side transistor and a first sink side transistor in a complementary manner, turn on and off the first and second sink side transistors based on a PWM signal, and turn on the first or second source side transistor kept in an off-state when the first or second sink side transistor is turned off by the PWM signal, to carry out synchronous rectification, when energizing a driving coil connected between a first connection point at which the first source side transistor and the first sink side transistor are connected in series and a second connection point at which the second source side transistor and the second sink side transistor are connected in series; a backflow detecting resistor connected to electrodes of the first and second sink side transistors, the electrodes being on an opposite side of the first and second sink side transistors to the first and second connection points; a backflow detecting comparator configured to output a comparison signal indicating a result of comparison between a voltage of a first terminal of the backflow detecting resistor and a voltage of a second terminal of the backflow detecting resistor, the first terminal being on a side of the electrodes and the second terminal being on an opposite side of the backflow detecting resistor to the first terminal; and a backflow prevention circuit configured to prohibit the synchronous rectification when the comparison signal indicates that the voltage of the second terminal is higher than the voltage of the first terminal.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<Sensorless Motor Driving Circuit>>

Figure 1:
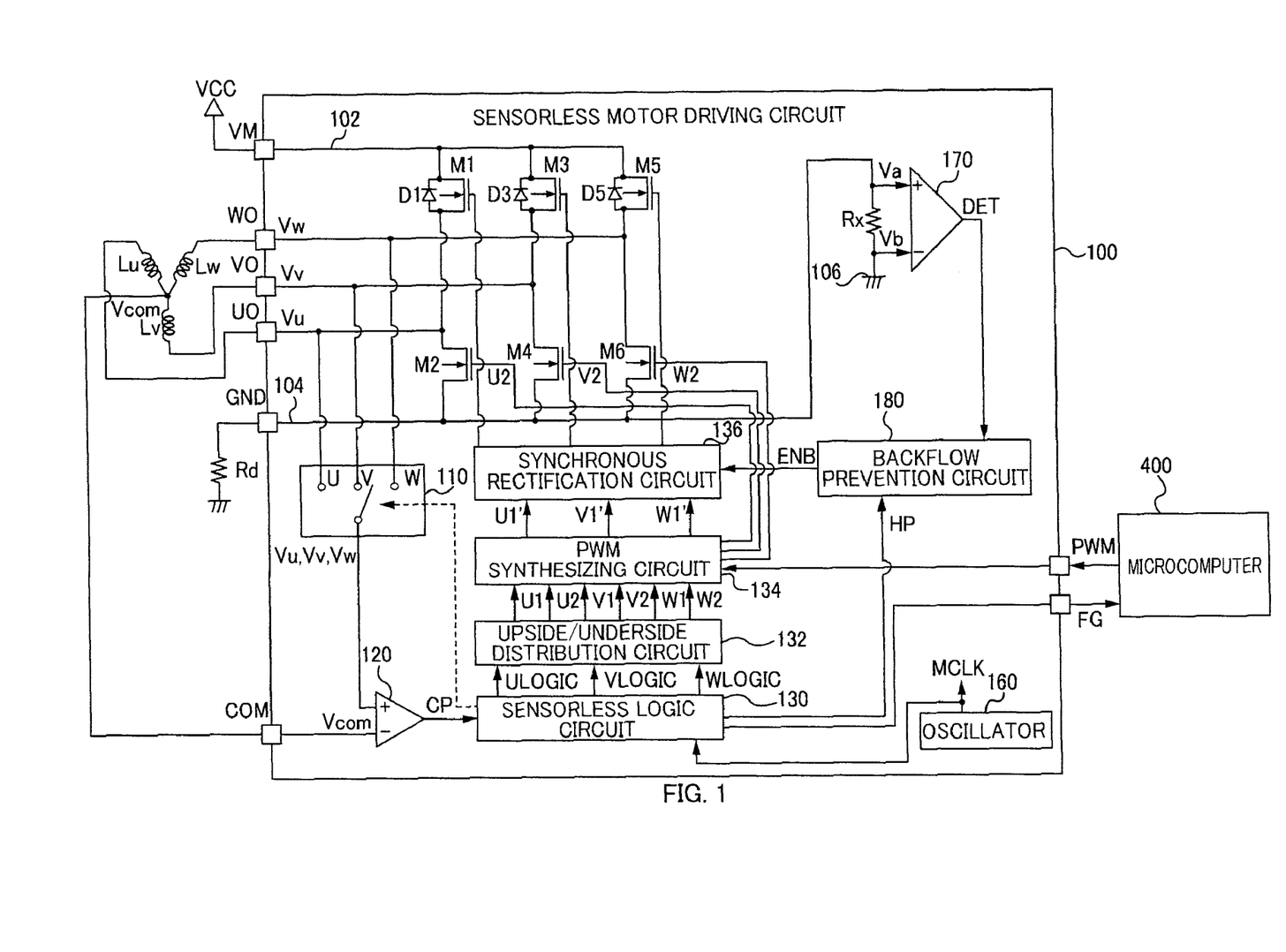
FIG. 1 is a diagram showing one example of a configuration of a motor driving system including a motor driving circuit according to one embodiment of the present invention.
Figure 2:
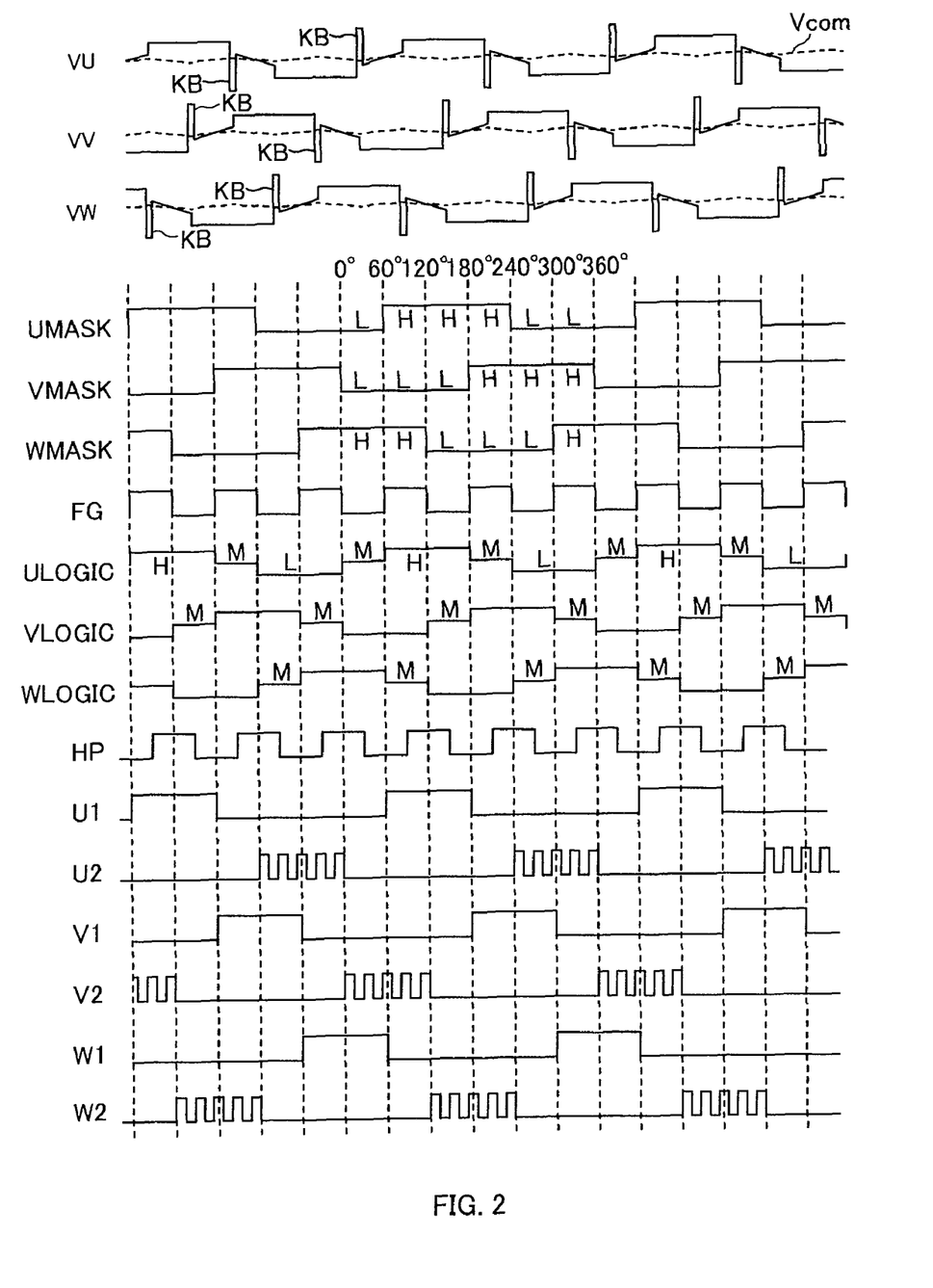
FIG. 2 is a waveform diagram for explaining an operation of a motor driving circuit according to one embodiment of the present invention.

A sensorless motor driving circuit 100 according to one embodiment of the present invention will now be described using FIG. 1 with reference to FIG. 2. Here, As a motor system including the sensorless motor driving integrated circuit 100, there will be described, for example, a fan motor system that drives a motor (fan motor) to rotate for a fan emitting heat generated in electrical appliances (personal computer, air conditioner, refrigerator, etc.) to the outside. As the sensorless motor driving circuit 100, a Bi-CMOS process integrated circuit is described, for example.

Three-phase (U-phase, V-phase, and W-phase) drive coils Lu, Lv, and Lw that are made by winding on a stator so as to be star-connected and displaced 120 electrical degrees in phase with respect to each other, are connected to a UO terminal, a VO terminal, and a WO terminal of the sensorless motor driving integrated circuit 100, respectively. As a result of this, the three-phase driving coils Lu, Lv, and Lw are connected to a drive transistor circuit configured with NMOS field-effect transistors M1 to M6 via the UO terminal, the VO terminal, and the WO terminal. In a present embodiment of the invention, the NMOS transistors M1, M3, and M5 disposed on the side of a source power line 102 are saturation-driven, and the NMOS transistors M2, M4, and M6 disposed on the side of a sink power line 104 are PWM-driven (non-saturation drive).

The NMOS field-effect transistors M1, M3, and M5 disposed on the side of the source power line 102 are source side (discharging side) transistors discharging a coil current IL flowing from the source power line 102 toward the driving coils Lu, Lv, and Lw of the U-phase, V-phase, and W-phase. Between drains and sources of the NMOS field-effect transistors M1, M3, and M5, parasitic diodes D1, D3, and D5 are present with anodes thereof being connected to the drains and cathodes thereof being connected to the sources. The NMOS field-effect transistors M2, M4, and M6 disposed on the side of the sink power line 104 are the sink side (absorbing side) transistors absorbing the coil current IL flowing from the driving coils Lu, Lv, and Lw of the U-phase, V-phase, and W-phase toward the sink power line 104.

When the NMOS field-effect transistors M1 to M6 are turned on and off in appropriate timing, the coil current IL corresponding to a level of a source voltage VCC is supplied to the three-phase driving coils Lu, Lv, and Lw. As a result of this, sensorless motor rotates in a predetermined direction (e.g., positive rotation), and coil voltages Vu, Vv, and Vw with the phase difference of the 120-degree electrical angle are generated at one end of the three phase drive coils Lu, Lv, and Lw. The coil voltages Vu, Vv, and Vw have frequencies corresponding to rotation speed of the sensorless motor, and are applied to input terminals U, V, and W of a 3-input-1-output switch circuit 110 having three input terminals and one output terminal via the UO terminal, VO terminal, and WO terminal.

At a comparator 120, a sensorless logic circuit 130 selects any one of the coil voltages Vu, Vv, and Vw to be applied to the input terminals U, V, and W of the switch circuit 110 in correspondence to any one phase of the U-phase, V-phase, and W-phase as an object of detection of a zero cross point, which will be described later. The any selected one of the coil voltages Vu, Vv, and Vw is applied to a positive terminal of the comparator 120 via an output terminal of the switch circuit 110. On the other hand, a neutral point voltage Vcom of the star connection of the three phase driving coils Lu, Lv, and Lw is applied to a negative terminal of the comparator 120 via a COM terminal of the sensorless motor driving circuit 100. That is, the coil voltage applied to the positive terminal is any one of coil voltages Vu, Vv, and Vw to be selectively output from the switch circuit 110 as an object to be compared to the neutral point voltage Vcom, which is a voltage at a connection point between drive coils of two phases other than the phase as an object of detection of the zero cross point.

Thus, the comparator 120 detects the zero cross point at which any one of the voltages Vu, Vv, and Vw selected at the switch circuit 110 and applied to the positive terminal and the neutral point voltage Vcom applied to the negative terminal cross each other. The comparator 120 then outputs a comparison signal CP of a square wave whose edges are switched between rising edge and falling edge at the zero cross point to the sensorless logic circuit 130, and also outputs an FG signal, which changes in the same timing of change of the comparison signal CP, to a microcomputer 400 via an FG output terminal. As a result of this, the microcomputer 400 detects the present rotation speed of the sensorless motor based on the FG signal so as to be able to adjust the on-duty of a PWM signal to be input to a PWM input terminal.

The sensorless logic circuit 130, in consideration of the fact that the sensorless motor itself is incapable of identifying the relative position between a rotor and a stator before the start of the motor, turns on and off the NMOS field-effect transistors M1 to M6 according to a predetermined order of energization, to perform a predetermined energization control for feeding coil current to the driving coils Lu, Lv, and Lw of U phase, V phase, and W phase. Specifically, the sensorless logic circuit 130 removes (masks) noises corresponding to a kickback pulse KB from the comparison signal CP output from the comparator 120, and, based on a system clock MCLK of an oscillator 160 and timing of edges of the resulting noise-free comparison signal CP, generates energization signals ULOGIC, VLOGIC, and WLOGIC.

Specifically, the sensorless logic circuit 130 generates mask signals UMASK, VMASK, and WMASK obtained by removing (masking) noises corresponding to the kickback pulse KB from the comparison signal CP output from the comparator 120, and outputs the generated signals. The sensorless logic circuit 130, using the mask signals UMASK, VMASK, and WMASK, generates the energization signals ULOGIC (=UMASK−VMASK), VLOGIC (=VMASK−MASK), and WLOGIC (=WMASK−UMASK) of three values (H level, M level, and L level) changing in timing of an electrical angle of 60 degrees, to be supplied to an upside-underside distribution circuit 132.

Furthermore, the sensorless logic circuit 130 synthesizes the energization signals ULOGIC, VLOGIC, and WLOGIC to generate an energization information signal HP that is a square wave whose edges are switched between rising edge and falling edge in timing of the electrical angle of 60 degrees. The sensorless logic circuit 130 also synthesizes the mask signals UMASK, VMASK, and WMASK to generate the FG signal of a square wave changing in timing of the electrical angle of 60 degrees and outputs the generated FG signal. This FG signal has a frequency corresponding to the rotation speed of the fan motor.

The upside-underside distribution circuit 132, based on the energization signals ULOGIC, VLOGIC, and WLOGIC, distributively generates drive signals U1, V1, and W1 for driving the gate electrodes of the upside (source side) NMOS field-effect transistors M1, M3, and M5 and drive signals U2, V2, and W2 for driving the gate electrodes of the underside (sink side) field-effect NMOS transistors M2, M4, and M6. For example, when the energization signals ULOGIC, VLOGIC, and WLOGIC are at "H level", "L level", and "M level", respectively, the upside-underside distribution circuit 132 generates the drive signals U1 and V2 of H level while generating the drive signals U2, V1, W1, and W2 of L level. As a result, the field-effect NMOS transistors M1 and M4 are turned on while the NMOS field-effect transistors M2, M3, M5, and M6 are turned off, so that the coil current IL flows from the U-phase coil Lu to the V-phase coil Lv.

The drive signals U1, U2, V1, V2, W1, and W2 output from the upside-underside distribution circuit 132 are input to a PWM synthesizing circuit 134, where the drive signals U1, U2, V1, V2, W1, and W2 are synthesized with (superposed on) the PWM signal input from the microcomputer 400 via the PWM input terminal. Specifically, the PWM synthesizing circuit 134 synthesizes the drive signals U2, V2, and W2 with the PWM signal to be supplied to the gate electrodes of the field-effect NMOS transistors M2, M4, and M6 respectively as drive signals U2', V2', and W2', and supplies the drive signals U1, V1, and W1, as they are, to a synchronous rectification circuit 136. The PWM signal is a speed control signal with on-duty in proportion to the rotation speed of the sensorless motor. The on-duty of the PWM signal represents a ratio of a pulse width within one period of the PWM signal and corresponds to the on-duty of the NMOS transistors M1 to M6 (the ratio between the on-time and the switching period (=on-time+off-time) of a driving transistor). For example, the on-duty of the PWM signal is set at 100% in the case of full speed rotation, at 0% in the case of stoppage, and at 50% in the case of the speed one half of the full speed rotation.

The drive signals U1', V1', and W1' output from the PWM synthesizing circuit 134 to the synchronous rectification circuit 136 are subjected to waveform conversion for synchronous rectification. Specifically, when the PWM signal supplied to any one of the gate electrodes of the NOMOS field-effect transistors M2, M4, and M6 changes in level from H level to L level, the synchronous rectification circuit 136 forcibly turns on any one of the gate electrodes of the NMOS field-effect transistors M1, M3, and M5. As a result, synchronous rectification is carried out to cause a regenerative current to flow through the drain-source paths of the NMOS field-effect transistors M1, M3, and M5. Therefore, the regenerative current flowing through the parasitic diodes D1, D3, and D5 is suppressed, so that power consumption of the parasitic diodes D1, D3, and D5 is suppressed.

<<Backflow Prevention Circuit>>

A backflow prevention circuit 180 will be described using FIG. 3 with reference to FIGS. 1 and 4.

In providing the backflow prevention circuit 180, a backflow detecting resistor Rx and a backflow detecting comparator 170 are provided for detecting whether a backflow current is generated flowing from a ground line 106 toward the source power line 102. The backflow detecting resistor Rx is resistance provided between the sink power line 104, to which the source electrodes of the NMOS field-effect transistors M2, M4, and M6 are connected in common, and the ground line 106. The backflow detecting comparator 170 compares a voltage Va at one terminal of the backflow detecting resistor Rx closer to the sink power line 104 (first terminal voltage) with a voltage Vb at the other terminal of the backflow detecting resistor Rx closer to the ground line 106 (second terminal voltage), and outputs a comparison signal DET indicating the comparison result to the backflow prevention circuit 180.

As to relation in magnitude between the voltages Va and Vb, in the usual case, the coil current IL flows from the source power line 102 through the sink power line 104 toward the ground line 106 so that the voltage Va is larger than the voltage Vb. Therefore, in this case, the comparison signal DET output from the backflow detecting comparator 170 becomes H level. On the other hand, when the backflow current flows from the ground line 106 through the sink power line 104 toward the source power line 102, the voltage Va becomes smaller than the voltage Vb. Therefore, in this case, the comparison signal DET output from the backflow detecting comparator 170 becomes L level.

Figure 3:
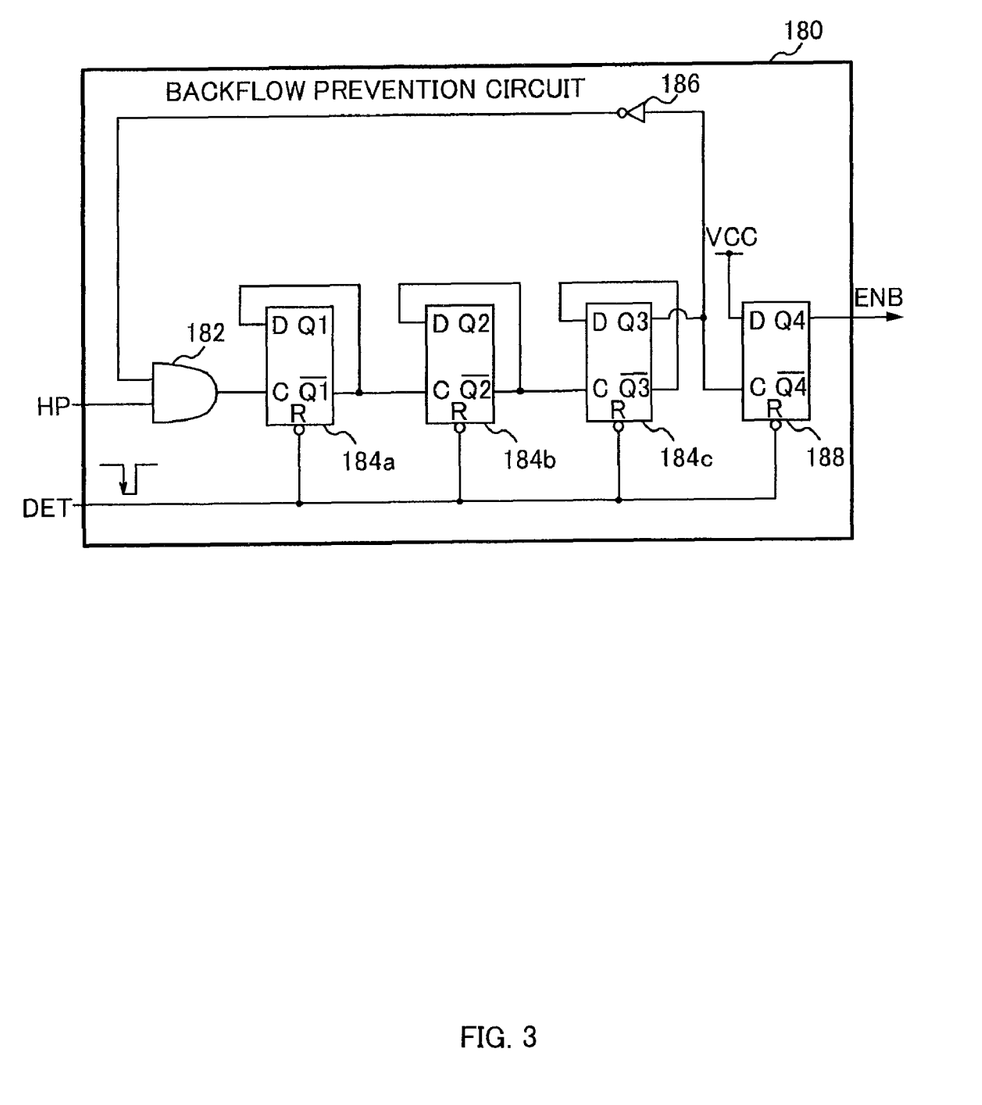
FIG. 3 is a diagram showing a configuration of a backflow prevention circuit according to one embodiment of the present invention.
Figure 4:
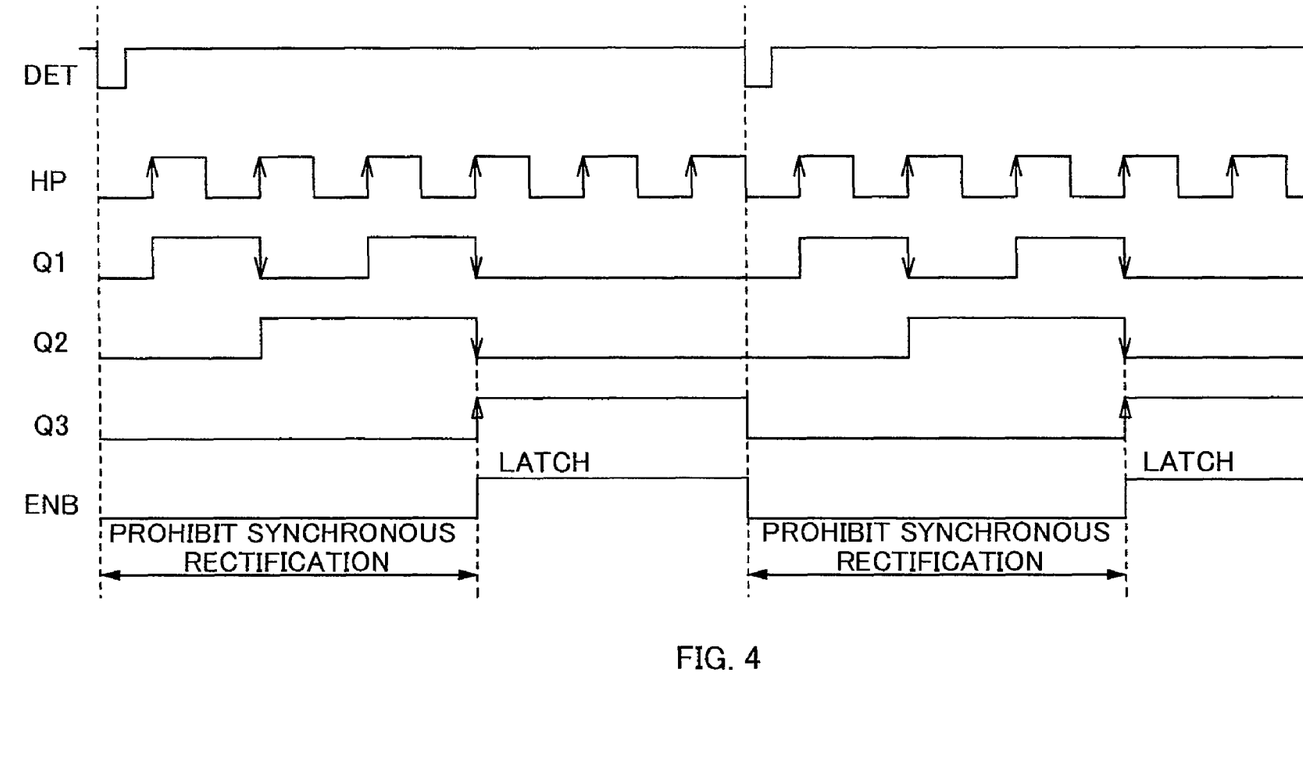
FIG. 4 is a waveform diagram for explaining an operation of the backflow prevention circuit according to one embodiment of the present invention.

FIG. 4 is a waveform diagram for explaining an operation of the backflow prevention circuit 180 shown in FIG. 3.

D flip-flop elements 184a to 184c, and 188 are reset when the comparison signal DET becomes L level, and functions as 4-bit up counter using the energization information signal HP as a clock signal. The D flip-flop element 184a is an element outputting a LSB out of 4 bits, and the D flip-flop element 188 is an element outputting a MSB out of 4 bits.

From a point that the comparison signal DET becomes L level, a count value of the above 4-bit up counter changes in an order of "0000", "0001", "0010", and "0011", based on rising edges of the energization information signal HP, during a period in which the number of rising edges of the energization information signal HP increases from one to three. In this period, an output terminal Q4 of the D flip-flop element 188 is in a "0" state, and therefore, a synchronous rectification enable signal ENB is kept at L level so that synchronous rectification is prohibited.

When the number of rising edges of the energization information signal HP reaches four after the point of the comparison signal DET's becoming L level, a signal output from an output terminal Q3 of the D flip-flop element 184c changes in level from L level to H level. At this time, a signal output from an AND element 182 is fixed to L level, and the D flip-flop element 188 latches the source voltage VCC (H level) input to a data input terminal of the D flip-flop element 188. As a result, the synchronous rectification enable signal ENB changes in level from L level to H level so that the prohibition of synchronous rectification is canceled.

When the comparison signal DET becomes L level (when backflow current is detected), the backflow prevention circuit 180 outputs the synchronous rectification enable signal ENB, which prohibits synchronous rectification, to the synchronous rectification circuit 136. As a result, when the PWM signal changes in level from H level to L level, the synchronous rectification circuit 136, based on the synchronous rectification enable signal ENB, does not forcibly turn on any one of the NMOS field-effect transistors M1, M3, and M5 for synchronous rectification but keeps the NMOS field-effect transistors M1, M3, and M5 turned off. Therefore, there is certainly prevented a backflow phenomenon that occurs when synchronous rectification is carried out, thereby preventing a destruction of the sensorless motor driving circuit 100 resulting from an abrupt increase in the source voltage VCC.

Based on the energization information signal HP indicating whether a coil voltage is generated or not, the backflow prevention circuit 180 performs control for prohibiting synchronous rectification during a period that is a period of predetermined times as long as the electrical angle of 60 degrees corresponding to a timing of checking the coil voltage. That is, there becomes a high possibility of backflow current flowing during a period until a coil voltage corresponding to an actual rotational state of the fan motor is generated. Therefore, a period during which the possibility of the backflow current flowing is high is considered to be a period that is a period of predetermined times as long as the electrical angle of 60 degrees. Thus the synchronous rectification circuit 136 prohibits synchronous rectification during this period so that the backflow current is effectively prevented.

There will hereinafter be described an operation of Backflow prevention at the time of synchronous rectification according to an embodiment of the present invention with reference to FIGS. 5 to 8. In FIGS. 5 to 8, there are described, for example, the driving coils Lu and Lv among the three-phase driving coils Lu, Lv, and Lw shown in FIG. 1. The driving coils Lu and Lv are connected between a connection point A at which the NMOS field-effect transistors M1 and M2 are connected in series and a connection point B at which the NMOS field-effect transistors M3 and M4 are connected in series.

Figure 5:
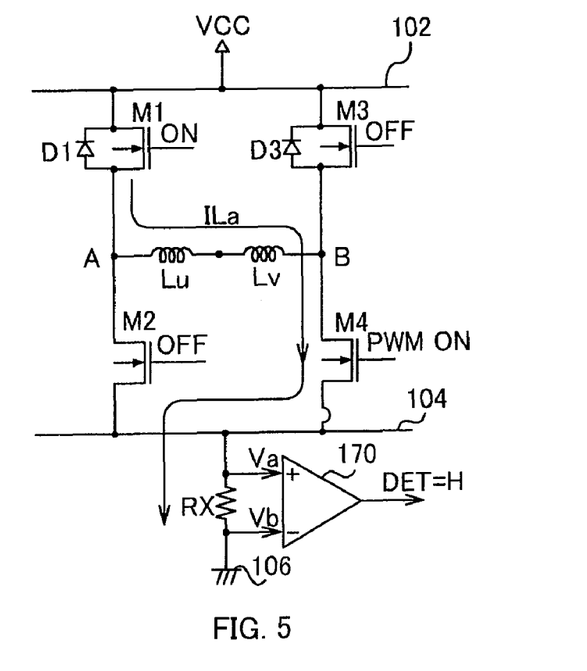
FIG. 5 is a diagram for explaining an operation of backflow prevention according to one embodiment of the present invention.

As shown in FIG. 5, it is assumed that a coil current ILa is caused to flow from the connection point A toward the connection point B through the driving coils Lu and Lv. In this case, the NMOS field-effect transistors M2 and M3 becomes off. Meanwhile, the NMOS field-effect transistor M1 continues to be on, and the NMOS field-effect transistor M4 is turned on due to the PWM signal of H level. In this case, the coil current ILa flows through the source power line 102, the drain-source path of the NMOS field-effect transistor M1, the connection point A, the driving coils Lu and Lv, the connection point B, the drain-source path of the field-effect NMOS transistor M4, the sink power line 104, the backflow detecting resistance Rx, and the ground line 106 in the above order. As a result, the voltage Va becomes greater than the voltage Vb, so that the comparison signal DET output from the backflow detecting comparator 170 is at H level.

Figure 6:
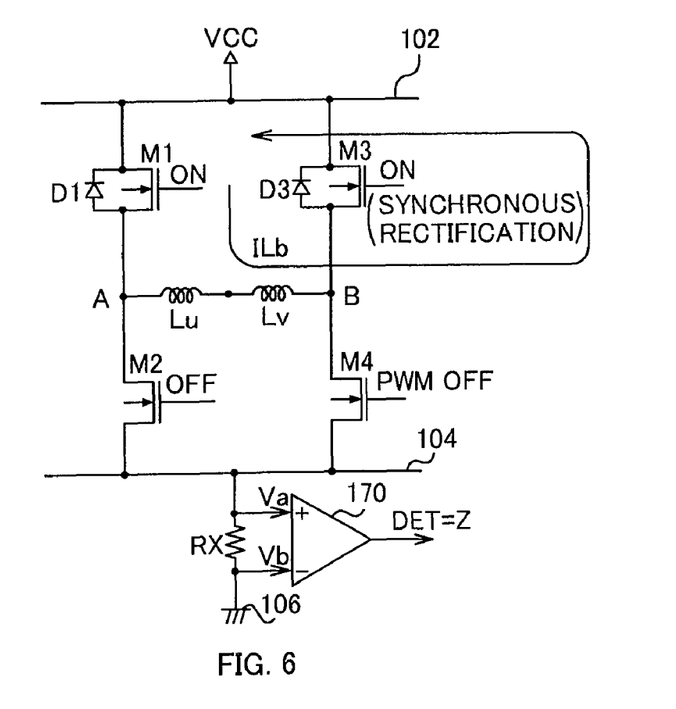
FIG. 6 is a diagram for explaining an operation of backflow prevention according to one embodiment of the present invention.

Then, as shown in FIG. 6, the PWM signal applied to the gate electrode of the NMOS field-effect transistor M4 changes in level from H level to L level to cause the NMOS transistor M4 to change in state from on to off. In this case, regenerative current ILb tries to flow in the same direction in which the coil current ILa flows when the NMOS field-effect transistor M4 is on (direction of the flow from the connection point A to the connection point B) because of inherent characteristics of the driving coils. However, if the regenerative current ILb flows through the parasitic diode D3 of the NMOS field-effect transistor M3, unnecessary power is consumed. To prevent that, the synchronous rectification circuit 136 carries out synchronous rectification to forcibly turn on the NMOS field-effect transistor M3 having on-resistance lower than that of the parasitic diode D3. At this time, the regenerative current ILb flows through the source power line 102, the drain-source path of the NMOS field-effect transistor M1, the connection point A, the driving coils Lu and Lv, the connection point B, and the drain-source path of the NMOS field-effect transistor M3 in the above order, as shown in FIG. 6.

Figure 7:
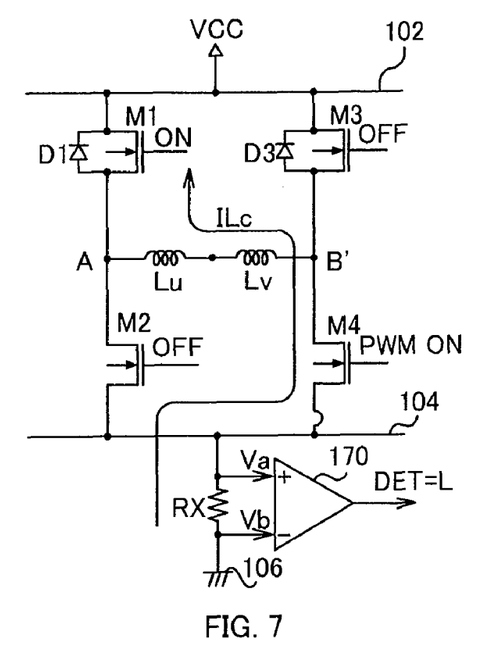
FIG. 7 is a diagram for explaining an operation of backflow prevention according to one embodiment of the present invention.
Figure 8:
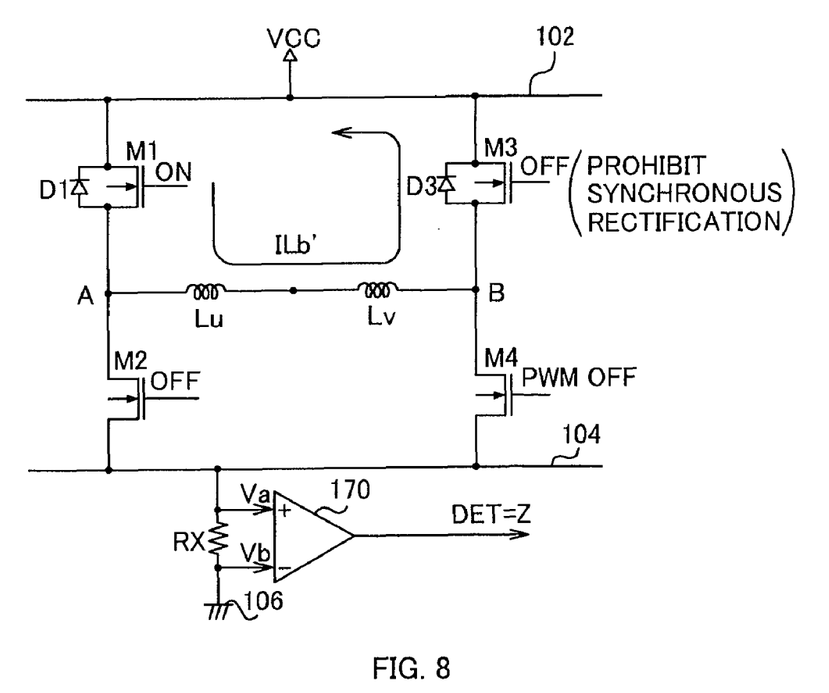
FIG. 8 is a diagram for explaining an operation of backflow prevention according to one embodiment of the present invention.

Then, when the PWM signal applied to the gate electrode of the NMOS field-effect transistor M4 changes in level again from L level to H level, the regenerative current ILb shown in FIG. 6 may attenuate incompletely and partly survive. For example, the regenerative current ILb tends to survive when the duty ratio of the PWM signal is low. If the regenerative current ILb survive, a backflow current ILc flows through the ground line 106, the backflow detecting resistance Rx, the sink power line 104, the drain-source path of the NMOS field-effect transistor M4, the connection point B, the driving coils Lv and Lu, the connection point A, the drain-source path of the NMOS field-effect transistor M1, and the source power line 102 in the above order, as shown in FIG. 7. When the backflow current ILc flows, the voltage Va becomes smaller than the voltage Vb, so that the comparison signal DET output from the backflow detecting comparator 170 becomes L level. When the comparison signal DET becomes L level, the backflow prevention circuit 180, in order to prohibit synchronous rectification in a predetermined period (e.g., a period that is a period predetermined times as long as the electrical angle of 60 degrees), outputs the synchronous rectification enable signal ENB that is at L level during the predetermined period. As a result, the synchronous rectification circuit 136 keeps the NMOS field-effect transistor M3 to be off during a period in which the synchronous rectification enable signal ENB is at L level. Thus, although a regenerative current ILb' flows through the source power line 102, the drain-source path of the NMOS field-effect transistor M1, the connection point A, the driving coils Lu and Lv, the connection point B, and the parasitic diode D3 in the above order, as shown in FIG. 8, the flow of the backflow current ILc can be prevented.

There can be easily adjusted periods during which synchronous rectification is prohibited as shown in FIG. 4 by changing the number of the D flip-flop elements connected in cascade manner in the backflow prevention circuit 180.

The above embodiments of the present invention are simply for facilitating the understanding of the present invention and are not in any way to be construed as limiting the present invention. The present invention may variously be changed or altered without departing from its spirit and encompass equivalents thereof.

As the source side transistors and the sink side transistors, the NMOS field-effect transistors M1 to M6 are provided, but it is not limitative. PMOS field-effect transistors may be provided instead. The NMOS field-effect transistor, however, has advantage in semiconductor process of having on-resistance lower than that of the PMOS field-effect transistor and enabling miniaturization. Therefore, it is more preferable that the field-effect NMOS transistors are provided as both source side transistors and sink side transistors.

The fan motor is not always limited to be a three-phase motor, but may be a single-phase motor. In this case, the source side transistors and sink side transistors makes up an H-bridge circuit for a driving coil of the single-phase motor. The fan motor may also be a sensor-attached motor having a Hall element. There is a demand for miniaturization of the sensorless motor driving circuit 100 corresponding to a demand for miniaturization of personal computers, servers, etc. For this reason, it is more preferable that a sensorless motor is provided as the fan motor. A specification of the fan motor often requires that a rectifier diode is interposed between the power supply for source voltage VCC and the VM terminal. Therefore, when a back flow phenomenon occurs, a forward voltage of the rectifier diode connected between the power supply for source voltage VCC and the VM terminal may push the source voltage VCC up to a high level. For this reason, an embodiment of the present invention functions more effectively when the fan motor is driven.

What is claimed is:

1. A motor driving circuit comprising:
a synchronous rectification driving circuit configured to turn on and off a first source side transistor and a second sink side transistor as well as a second source side transistor and a first sink side transistor in a complementary manner, turn on and off the first and second sink side transistors based on a PWM signal, and turn on the first or second source side transistor kept in an off-state when the first or second sink side transistor is turned off by the PWM signal,
to carry out synchronous rectification,
when energizing a driving coil connected between a first connection point at which the first source side transistor and the first sink side transistor are connected in series and a second connection point at which the second source side transistor and the second sink side transistor are connected in series;
a backflow detecting resistor connected to electrodes of the first and second sink side transistors, the electrodes being on an opposite side of the first and second sink side transistors to the first and second connection points;
a backflow detecting comparator configured to output a comparison signal indicating a result of comparison between a voltage of a first terminal of the backflow detecting resistor and a voltage of a second terminal of the backflow detecting resistor, the first terminal being on a side of the electrodes and the second terminal being on an opposite side of the backflow detecting resistor to the first terminal; and
a backflow prevention circuit configured to prohibit the synchronous rectification for a predetermined period when the comparison signal indicates that the voltage of the second terminal is higher than the voltage of the first terminal.

2. The motor driving circuit of claim 1, wherein
the backflow prevention circuit includes a counter configured to count for a predetermined period in response to the comparison signal indicating that the voltage of the second terminal becomes higher than the voltage of the first terminal, and prohibits the synchronous rectification in a period during which the counter counts for the predetermined period.

3. The motor driving circuit of claim 2, wherein
a motor having the driving coil includes a sensorless motor, and wherein
the counter counts for the predetermined period that is a period predetermined times as long as a period during which a coil voltage generated at the driving coil is detected.

4. The motor driving circuit of claim 3, wherein
the motor includes a fan motor.

* * * * *

UNITED STATES PATENT AND TRADEMARK OFFICE
CERTIFICATE OF CORRECTION

| | |
|---|---|
| PATENT NO. | : 7,863,840 B2 |
| APPLICATION NO. | : 12/056800 |
| DATED | : January 4, 2011 |
| INVENTOR(S) | : Tanabe et al. |

Page 1 of 1

It is certified that error appears in the above-identified patent and that said Letters Patent is hereby corrected as shown below:

Column 5, line 63: replace "MASK" with --WMASK--.

Signed and Sealed this

Fifteenth Day of February, 2011

David J. Kappos
*Director of the United States Patent and Trademark Office*